United States Patent Office 3,786,150
Patented Jan. 15, 1974

3,786,150
FUNGICIDAL USE OF CERTAIN BENZ
[d]ISOTHIAZOLES
Fui-Tseng H. Lee and Gert P. Volpp, Princeton, N.J.,
assignors to FMC Corporation, New York, N.Y.
No Drawing. Filed Dec. 27, 1971, Ser. No. 212,674
Int. Cl. A01n 9/12
U.S. Cl. 424—270     1 Claim

ABSTRACT OF THE DISCLOSURE 3,6-dichloro-7-nitrobenz[d]isothiazole, useful as a fungicide, is described. The preparation of the compound and fungicidal formulations containing it are also described.

This invention relates to fungicides, particularly those based on benz[d]isothiazoles.

It is the practice in commercial agriculture to protect food crops from destructive fungi and related microorganisms by treating the crops with anti-fungal active substances. Although considerable success has been realized, the search continues for more effective members of this class of agriculturally important chemicals. What is sought is the seldom realized combination of high fungicidal activity with minimal toxic effects on beneficial organims. And, of course, a commercial fungicide should be economic to manufacture and be safe and easy to handle and transport. Although many materials exhibit fungicidal activity, the benz[d]isothiazole of the type with which the present invention is concerned, has not been reported in this connection.

It has now been discovered that the aforedelineated desiderata are possessed to a marked degree by 3,6-dichloro-7-nitrobenz[d]isothiazole and the provision of same and fungicidal formulations containing it constitutes the principal object and purpose of the invention.

The 3,6-dichloro-7-nitrobenz[d]isothiazole of the invention can be obtained by carrying out the following sequence of transformations:

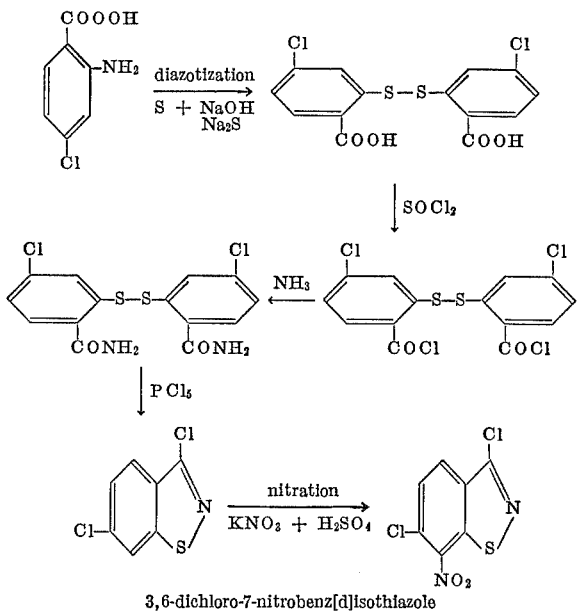

The specific details of the synthesis are set forth below.

EXAMPLE 1

Preparation of 3,6-dichloro-7-nitrobenz[d]isothiazole (Step 1) Bis(2-carboxy-5-chlorophenyl) disulfide: Two hundred grams of 2-amino-4-chlorobenzoic acid was mixed into 1400 ml. of 0.8 N sodium hydroxide. Insoluble materials was removed by filtration and the filtrate was added to a solution of 74.6 g. of sodium nitrite in 1100 ml. of water. This mixture was chilled and added to 320 ml. of concentrated hydrochloric acid, maintaining the temperature at 0–5° C. The acidified mixture (at 0–5° C.) was added to a mixture comprising 260 g. of hydrated sodium sulfide, 33.2 g. of sulfur and 52 g. of sodium hydroxide in 290 ml. of water. After the reaction mixture had set at room temperature for several days, it was filtered and acidified to pH 5 with hydrochloric acid. After removal of precipitate, the acidified filtrate was adjusted to pH 3 with hydrochloric acid. Insoluble product was collected and dissolved in 2 l. of 0.35 M aqueous sodium carbonate. Upon adjusting the sodium carbonate solution to pH 2, 90.1 g. of bis(2-carboxy-5-chlorophenyl) disulfide (M.P.=280–315° C.) was precipitated. The precipitate from the solution at pH 5 was worked up in the same manner. Upon further acidification of sodium carbonate filtrates, an additional 98 g. of product (M.P.>300° C.) was obtained. The IR spectra of the two solids were essentially identical and were consistent with the assigned structure.

(Step 2) Bis-(2-chlorocarbonyl-5-chlorophenyl) disulfide: A mixture of 90.1 g. of the bis(2-carboxyl-5-chlorophenyl) disulfide of Example 1, 250 g. of thionyl chloride and 250 ml. of benzene was refluxed for 5 hours. Volatile components were removed by distillation at reduced pressure and the residue was recrystallized from benzene (using activated carbon) to give 39 g. of semipure product. The synthesis was repeated using the 98 g. of additional bis(2-carboxy-5-chlorophenyl) disulfide from Step 1 to give 82 g. of product. Products were combined and recrystallized from benzene/hexane to give 64 g. of bis(2-chlorocarbonyl-5-chlorophenyl) disulfide; M.P.=149–154° C.

(Step 3) Bis(2-aminocarbonyl-5-chlorophenyl) disulfide: The product of Example 2 was dissolved in 900 ml. of tetrahydrofuran and the solution was filtered. The solution was chilled with an ice bath and ammonia was passed through. Precipitated product was collected and dried to give 62.2 g. of bis(2-aminocarbonyl-5-chlorophenyl) disulfide; M.P.=301–305° C. The IR spectrum of the product was consistent with the assigned structure.

(Step 4) 3,6-dichlorobenz[d]isothiazole: The product from Example 3 was thoroughly mixed with benzene for several minutes after which the benzene was removed at reduced pressure. To the solid was added 104.5 g. of phosphorus pentachloride and the reaction mixture was slowly (4 hrs.) heated to 160° C. By-product hydrogen chloride was removed with a cold sodium hydroxide trap. After cooling, the product was triturated with benzene and then washed with water. The aqueous washings were extracted several times with benzene. The combined benzene solutions were concentrated to a solid residue which upon sublimation gave 28.9 g. of 3,6-dichlorobenz[d]isothiazole; M.P.=103–106° C. The IR spectrum confirmed the disappearance of the amido group; other absorption bands were in agreement with the assigned structure.

(Step 5) 3,6-dichloro-7-nitrobenz[d]isothiazole: One gram of the product from Step 4 was dissolved in 10 ml. of sulfuric acid and 0.5 g. of potassium nitrate was added; mixing of the reagents was carried out at 0–5° C. The reaction mixture was stirred at room temperature for one hour and poured onto crushed ice. Precipitated product (1.2 g.; M.P.=110–112° C.) was recrystallized from methylene chloride-ether to give 3,6-dichloro-7-nitrobenz [d]isothiazole melting at 118–120° C. Thin layer chromatographic analysis indicated a single product and the IR and NMR spectra were consistent with the assigned structure.

*Analysis.* — Calcd. for $C_7H_2Cl_2N_2O_2S$ (percent): C, 33.74; H, 0.82; N, 11.25. Found (percent): C, 33.52; H, 1.05; N, 11.03.

The compound of the invention is highly effective against a broad range of microorganisms as illustrated in the following examples:

EXAMPLE 2

In vivo biological activity (A) Bean rust (casual agent: *Uromyces phaseoli*). A 25 percent wettable powder formulation was prepared by grinding together 250 parts of 3,6-dichloro-7-nitrobenz[d]isothiazole, 720 parts of attapulgite clay, 15 parts of sodium lignosulfonate and 15 parts of sodium alkylnaphthalenesulfonate.

A continually-stirred suspension of this formulation in water containing the required amount to give the desired concentration was applied to a four-week-old tomato plant by means of stationary atomizing nozzles operating under 20 p.s.i. air pressure and situated such that one nozzle is directed above and one below the foliage of the plant. During spraying, the plant being treated is rotated on a turntable such that all parts of the plant are wet to run-off. The following day, the treated plant was dusted thoroughly with a two percent spore powder, comprising ureido-spores of *Uromyces phaseoli* admixed with finely-divided talc. The test plant was placed in a humidity chamber (maintained at 20–23° and 94–100% humidity) for 24 hours, then transferred to the greenhouse and observed until disease symptoms had developed (4–10 days). The percent control was recorded relative to plants infected as above but which had received no chemical treatment. Results of tests are summarized in Table 1.

(B) Rice blast (casual agent: *Piricularia oryzae*). In the same manner as for bean rust, a stand of rice (20–30 plants) in the three-leaf stage was sprayed with an aqueous suspension of the 25% wettable powder formulation. The following day the treated plants were sprayed with a suspension of *Piricularia oryzae* (International Race Group IB, Race 5) containing 5 drops of surfactant per 750 ml. of water. The plants were held in the humidity chamber for one day, then transferred to the greenhouse and observed until disease symptoms had developed (approximately 4 days). The percent control was recorded relative to plants infected as above, but which had received no chemical treatment. Results are summarized in Table 1.

(C) Brown spot of rice (casual agent: *Helminthosporium oryzae*. Tests for control of brown spot of rice were carried out in the same manner as were the tests against rice blast. Results are summarized in Table 1.

EXAMPLE 3

In vitro biological activity

Twenty ml. of melted sterile iron agar/potato-dextrose broth mixture was cooled to 42° and then poured into a Petri dish. Into the cooling agar was immediately stirred a solution of 3,6 - dichloro-7-nitrobenz[d]isothiazole in acetone (0.1 mg. in 0.1 ml. gave 5 p.p.m.). When the chemically-treated agar had solidified, it was inoculated with a block (ca. 3 mm. on edge) of agar carrying mycelium of the test organism. The inoculated agar was incubated at 25° for six days. The percent control of the test organism was determined by comparison of the diameter of the colony in the chemically-treated dish with that of a non-chemically-treated dish. The results are summarized in Table 2.

The 3,6-dichloro - 7 - nitrobenz[d]isothiazole herein forms effective fungicidal compositions when formulated with any of the relatively inert adjuvants and carriers normally employed for facilitating the dispersion of active ingredients for fungicidal applications, recognizing the fact that the formulation and mode of application of a toxicant may affect the activity of the material in a given application. However, if the formulation permits even distribution of the active ingredient and contact with the infected area, the precise nature of the formulation is not critical. Thus the 3,6-dichloro-7-nitrobenz[d]isothiazole of the invention may be formulated in the usual manner to provide wettable powders, dusts, emulsifiable concentrates, solutions, or any of several other known types of formulations depending on the desired mode of application. These formulations may contain as little as 0.5% to as much as 95% or more by weight of active ingredient.

Wettable powders are in the form of finely divided particles which disperse readily in water or other dispersants. The wettable powder is ultimately applied either as a dry dust or as a suspension in water or other liquid. Typical carriers for wettable powders include attapulgite fuller's earth, kaolin clays, silicas or other readily wet organic or inorganic diluents. Wettable powders normally are prepared to contain about 5–95% of active ingredient, depending on the absorbency of the carrier, and usually also contain a small amount of a wetting or dispersing agent. For example, a useful wettable powder formulation contains 25.0 parts of the benz[d]isothiazole, 72.0 parts of kaolin, and 1.5 parts of sodium lignosulfonate and 1.5 parts of sodium alkylnaphthalenesulfonate as wetting agents.

Dusts are free-flowing admixtures of the active ingredient with finely divided solids such as talc, natural clays, kieselguhr, flours such as walnut shell and cotton seed flours, and other organic and inorganic solids which act as dispersants and carriers for the toxicant; these finely divided solids have an average particle size of less than about 50 microns. A typical dust formulation, useful herein, is one containing 1.0 part of the alkenoate and 99.0 parts of talc.

Emulsifiable concentrates are homogeneous liquid or paste compositions which are dispersible in water or other dispersant, and may consist entirely of the alkenoate with a liquid or solid emulsifying agent, or may also contain a liquid carrier, such as xylene, heavy aromatic naphthas, dimethyl sulfoxide, isophorone, and other nonvolatile organic solvents. For application, these concentrates are dispersed in water or another liquid carrier, and normally applied as a spray to the area to be treated. The percentage by weight of the essential active ingredient may vary according to the manner in which the composition is to be applied, but in general comprises 0.5–95% of the fungicidal composition.

Other useful formulations for fungicidal applications include simple solutions of the active ingredient in a solvent in which it is completely soluble at the desired concentration, such as acetone, alkylated naphthalenes, xylene, or other organic solvents.

Typical wetting, dispersing, or emulsifying agents used in agricultural formulations include, for example, the alkyl and alkylaryl sulfonates and sulfates and their sodium salts; polyhydric alcohols; and other types of surface-active agents, many of which are available in commerce. The surface-active agent, when used, normally comprises from 1–15% by weight of the composition.

TABLE 1

Activity of 3,6- dichloro-7- nitrobenz [d] isothiazole against Foliar diseases

| Concentration, p.p.m. | Percent control | | |
|---|---|---|---|
| | Bean rust | Rice blast | Brown spot |
| 300 | 100 | 100 | 75 |
| 150 | 98, 100 | 100, 100 | 60 |
| 75 | 60 | 75 | 0 |

TABLE 2

In vitro biological activity

| Organism | Percent reduction in growth at concentration of— | | | |
|---|---|---|---|---|
| | 10 p.p.m. | 5 p.p.m. | 2.5 p.p.m. | 1.25 p.p.m. |
| *Alternaria solani* (early blight) | 88 | 71 | | |
| *Botrytis cinerea* (gray mold) | 94 | 88 | 92 | 70 |
| *Colletotrighum phomoides* (tomato anthracnose) | 67 | | | |
| *Fusarium oxysporum* (tomato wilt) | 37 | 35 | | |
| *Helminthosporium oryzae* (brown spot of rice) | 94 | 62 | | |
| *Helminthosporium maydis* (corn blight) | 96 | | | |
| *Pirigutaria oryzae* (rice blast) | 80 | 60 | 40 | 17 |
| *Sclerotinia fructigola* (brown rot) | 89 | 89 | 89 | 71 |
| *Sclerotinia sclerotiorum* (white mold) | 92 | 68 | 0 | 0 |
| *Verticillium albo-atrum* (cotton defoliation wilt) | 47 | | | |

It is apparent that modifications may be made in the formulation and application of the compositions of this invention, without departing from the novel concept herein, as defined in the following claims.

What is claimed is:

1. A method of controlling plant-infesting fungi comprising applying to the situs of said infested plants a fungicidally effective amount of 3,6-dichloro-7-nitrobenz[d]isothiazole.

References Cited

UNITED STATES PATENTS 3,655,686   4/1972   Becke et al. _____ 424—270 X

OTHER REFERENCES

Chemical Abstracts: 60:12000d–12001b (1964).
Chemical Abstracts: 59:8721d (1963).

ALBERT T. MEYERS, Primary Examiner
L. SCHENKMAN, Assistant Examiner

U.S. Cl. X.R.

260—304